United States Statutory Invention Registration [19]

[11] Reg. Number: H540

Caponi

[43] Published: Nov. 1, 1988

[54] EXPLOSIVE SHOCK ATTENUATOR FOR HIGH FRAGMENT VELOCITY WARHEADS

[75] Inventor: Elso R. Caponi, Longwood, Fla.

[73] Assignee: The United States of America as represented by the Secretary of the Army, Washington, D.C.

[21] Appl. No.: 87,856

[22] Filed: Aug. 20, 1987

[51] Int. Cl.[4] ..... F42B 13/18
[52] U.S. Cl. ..... 102/495
[58] Field of Search ..... 102/389, 491, 492, 494–497, 102/532

[56] References Cited

U.S. PATENT DOCUMENTS

| | | | |
|---|---|---|---|
| 3,646,888 | 3/1972 | Posson et al. | 102/67 |
| 3,818,833 | 6/1974 | Throner, Jr. | 102/7.2 |
| 3,977,327 | 8/1976 | Brumfield | 102/67 |
| 4,192,234 | 3/1980 | McCracken | 102/67 |
| 4,662,281 | 5/1987 | Wilhelm et al. | 102/494 |

*Primary Examiner*—Harold J. Tudor
*Attorney, Agent, or Firm*—John C. Garvin, Jr.; Freddie M. Bush; James T. Deaton

[57] ABSTRACT

A warhead has a high energy explosive charge mounted therein for launching a multiplicity of clustered metal fragments for killing a target with shock attenuator means mounted between the cluster of fragments and the high explosive charge to attenuate shock and prevent breakup of individual fragments.

6 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

EXPLOSIVE SHOCK ATTENUATOR FOR HIGH FRAGMENT VELOCITY WARHEADS

DEDICATORY CLAUSE

The invention described herein was made in the course of or under a contract or subcontract thereunder with the Government and may be manufactured, used, and licensed by or for the Government for governmental purposes without the payment to me of any royalties thereon.

BACKGROUND OF THE INVENTION

In the past, warheads which have used a multiplicity of fragments to be projected at a target by high explosive projection has resulted in the fragments being broken up upon detonation of the high explosive that is used to project the fragments to the target. This breakup of the individual fragments is not desirable since the fragments are designed to produce a particular kill based on the overall structure of each individual fragment. Therefore, there is a need for a structure that will enable the fragments to be propelled at a target at velocities desired and still maintain the integrity of the fragments as originally fabricated.

Therefore, it is an object of this invention to provide a structure that enables a warhead of a multiplicity of fragments to have the fragments propelled at high velocity toward a target without fragment breakup of each individual fragment of the warhead.

Another object of this invention is to provide a warhead in which shock attenuator means are provided between a multiplicity of fragments of a warhead and the high explosive used in propelling the multiplicity of fragments toward a target.

Still another object of this invention is to provide shock attenuator means for a multi-fragment warhead in which the shock attenuator means includes an aluminum sheet between the high explosive and the multiplicity of fragments.

Still another object of this invention is to provide a warhead that utilizes in conjunction with an aluminum sheet a layer of plastic material between the aluminum sheet and the multi-fragment warhead.

A still further object of this invention is to utilize a multi-fragment warhead in which the multi-fragments are mounted on a base plate of a material such as low carbon steel.

Other objects and advantages of this invention will be obvious to those skilled in this art.

SUMMARY OF THE INVENTION

In accordance with this invention, a multi-fragment warhead is provided in which shock attenuating means is provided between multi-fragments of the warhead and a high explosive charge that is used to propel the multi-fragments toward a target to attenuate shock from the high explosive charge to prevent fragment break-up of the individual fragments of the multi-fragment warhead.

DESCRIPTION OF THE PREFERRED EMBODIMENT

Figure 1:
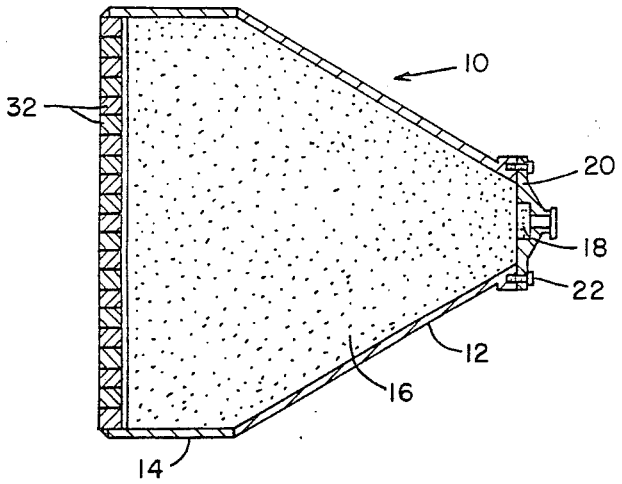
FIG. 1 is a sectional view of a warhead in accordance with this invention.
Figure 2:
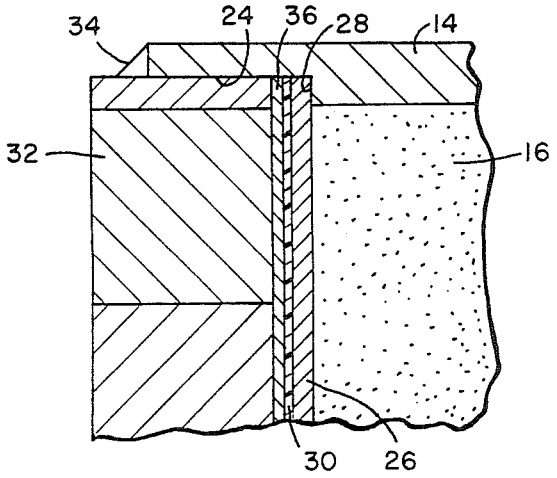
FIG. 2 is an enlarged sectional view of the warhead with portions cut-away and illustrating the structure of the shock attenuator and FIG. 3 is a front view partially cut-away and illustrating the shape of the multiple fragments of the warhead.
Figure 3:
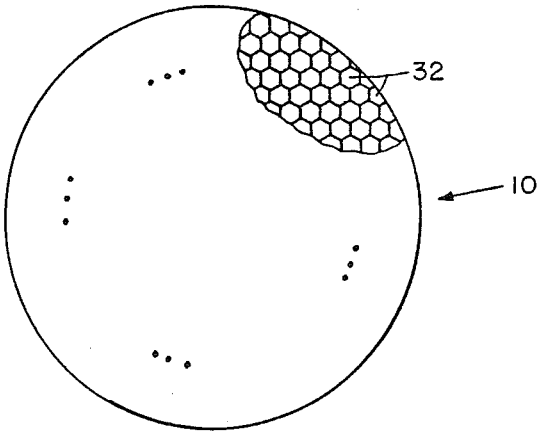

Referring now to the drawing, warhead 10 includes a housing with a tapered section 12 and a cylindrical section 14, a high explosive charge 16 of conventional structure is mounted inside housing sections 12 and 14 and a detonation charge 18 for setting off high explosive charge 16 is mounted in structure 20 that is secured to tapered section 12 at one end by conventional securing means 22 as illustrated. Sections 12, 14, and 20 are preferably made of low carbon steel. Cylindrical section 14 has a step bore 24 at one end and an aluminum disc 26 is mounted in bore 24 and against end surface 28 defined at the end of bore 24. With cylindrical section 14 having a diameter of about 16 inches, disc 26 should be about 0.100 inches thick. A second disc layer 30 of polycarbonate material such as for example an epoxy material of Epon 828 is mounted in bore 24 and contiguous one surface of disc 26. A multiplicity of fragment warheads 32 are mounted in bore 24 by the fragments being secured together in a conventional manner and being secured by weld 34 at the cylindircal peripheral. In a preferred embodiment, metal fragments 32 are made of steel and are copper brazed to low carbon steel base plate 36 with the outer periphery of the cluster of fragments being welded as illustrated at 34. That is, fragments 32 can include a base plate 36 as illustrated in FIG. 2 or fragments 32 can be secured together without base plate 36. Fragments 32 are preferrably made of a material such as steel to deliver the desired blow to a target.

In operation, when it is desired to ignite warhead 10, detonator charge 18 is set off in a conventional manner to set off main warhead high explosive charge 16 which produces shock from explosive detonation to propel fragments 32 toward a target. The shock from explosive charge 16 is impeded at each surface interface of members 26, 30 and 36 of the attenuator assembly to thus reduce the shock that reaches fragments 32. This results in fragments 32 being accelerated to very high velocity without breakup. Low carbon steel mounting plate 36 for fragments 32 is an optional third layer in the acoustic impedance assembly and attenduates shock transmission, although the primary purpose of steel disc 36 is as an adjunct to the fragment pack assembly. The waves produced by explosive charge 16 are reflected in part at each material interface of members 26, 30 and 36 where impedance changes. The reflected wave or waves is a compression wave thereby countering the tension waves, thus reducing/attenuating tensile strength of the on-coming shock. As a result of the shock attenuation, fragments 32 are prevented from breakup under high explosive projection. It is further noted, that the attenuator assembly also delays venting of detonation products of explosive warhead 16 to thus increase energy transfer from the explosive to the fragments which improves warhead performance and reduces over-all weight. This is true, since discs 26, 30 and 36 tend to contain the explosive until they exit the end of bore 24.

I claim:

1. A warhead comprising a housing having a high energy main warhead charge with a booster charge at one end thereof for setting off the main warhead charge, a multiplicity of predetermined shaped metal fragments for being propelled for killing a target and said fragments being secured together in a cluster at an opposite end of said housing from said booster charge, and shock attenuator means mounted between an end surface of said clustered fragments and said high energy main warhead charge to attenuate shock transfer from said high energy main warhead charge to said fragments to prevent fragment breakup upon detonation of said high energy main warhead charge.

2. A warhead as set forth in claim 1, wherein said shock attenuator means includes a first disc shaped member of aluminum and being contiguous said high energy main warhead charge and a second disc of polycarbonate material and being positioned between said aluminum disc and said fragments.

3. An explosive charge warhead as set forth in claim 2, wherein said fragments are clustered and secured to a base plate which is contiguous said polycarbonate disc.

4. A warhead as set forth in claim 3, wherein said polycarbonate disc is made of epoxy.

5. A warhead as set forth in claim 3, wherein said fragments are made of steel and said fragments are copper brazed to said base plate which is made of steel and said fragments being secured to said housing by being welded thereto at the periphery of said fragment cluster.

6. A warhead as set forth in claim 3, wherein said clustered fragments and said shock attenuator means are telescoped into a bore at said opposite end of said housing.

* * * * *